United States Patent Office 3,132,147
Patented May 5, 1964

3,132,147
PREPARATION OF QUINOLIZINE DERIVATIVES
Clemens Schöpf, Darmstadt, and Rudolf Klug, Aschaffenburg, Germany, assignors to E. Merck, Aktiengesellschaft, Darmstadt, Germany
No Drawing. Filed June 15, 1962, Ser. No. 202,681
Claims priority, application Germany June 19, 1961
6 Claims. (Cl. 260—288)

This invention relates to a novel process of producing quinolizine derivatives, and to the novel intermediates produced therein.

Prior methods for producing quinolizine derivatives are based on a highly complex reaction scheme which results in very low yields of the final products. In view of the importance of quinolizine derivatives as pharmaceuticals, and as intermediates for the preparation of compounds of a class, some of which exhibit therapeutic uses, it is desirable to provide a process which is technologically and economically superior to the prior art processes.

An object of this invention, therefore, is to provide a novel process for the production of quinolizine derivatives.

Another object of this invention is to provide novel intermediates useful for producing quinolizine derivatives.

Still other objects and advantages of the present invention will become apparent upon further study of the specification and appended claims.

To attain the objects of the invention, there is provided a process wherein a cyclic beta-amino ketone as represented by the Formula I (I)
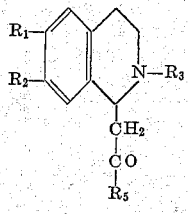

wherein
$R_1$ and $R_2$ are the same or different and represent H, $OCH_3$, $OC_2H_5$, Cl or an alkyl residue having 1–4 C atoms or $-O-CH_2-O-$,
$R_3$ is hydrogen or an acyl radical having 1–10 carbon atoms,
$R_5$ is an alkyl residue having 1–7 C-atoms, a phenyl radical, a phenyl radical substituted by $R_1$ and $R_2$ or the radical

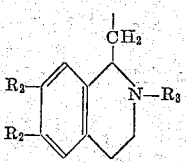

wherein $R_1$, $R_2$ and $R_3$ have the previously indicated significance, is reacted with a metal-organic vinyl compound as represented by the Formula II (II)
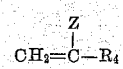

wherein
$R_4$ is hydrogen or an alkyl residue having 1–4 C-atoms,
Z is MgX or an alkali metal,
X is chlorine, bromine or iodine.

The addition product obtained thereby is treated with hydrolyzing agents, to produce a tertiary alcohol as represented by the Formula III (III)
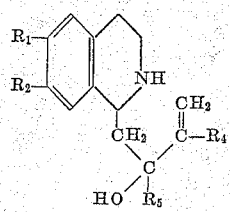

wherein $R_1$, $R_2$, $R_4$ and $R_5$ are defined as before.

The hydroxyl group of the tertiary alcohol is then replaced by chlorine or bromine by treatment with an inorganic acid halogenide, and the unsaturated halogenide obtained thereby undergoes allyl transposition and is represented by the Formula IV (IV)
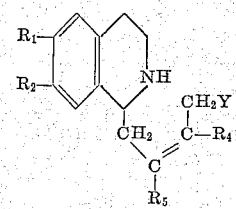

wherein $R_1$, $R_2$, $R_4$ and $R_5$ are defined as before and Y represents chlorine or bromine.

This allyl compound is then treated with alkaline agents to produce ring formation, thereby forming a quinolizine derivative of the Formula V (V)
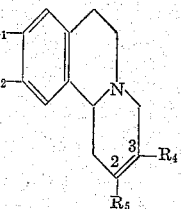

wherein $R_1$, $R_2$, $R_4$ and $R_5$ are defined as before. The double bond in 2,3-position of the above compound may be catalytically hydrogenated, if desired.

According to a particular preferred embodiment of the present process, cyclization is accomplished without isolating the intermediate product IV.

The new process thus comprehends four or five reaction stages respectively:

(a) Reaction of the cyclic beta-amino ketone I with an organometallic vinyl compound II to the tertiary beta-amino alcohol III;

(b) Saponification of an acyl group which may be present in the 1-position of the tertiary beta-amino alcohol;

(c) Conversion of the tertiary beta-amino alcohol III into the unsaturated halogenide IV, and the associated allyl transposition;

(d) Cyclization of the unsaturated halogenide IV to the 2-dehydro-quinolizine derivative V by splitting off hydrogen halide;

(e) If desired, hydrogenation of the quinolizine derivative V to the corresponding saturated compound.

The individual reaction stages are elucidated as follows:

(a) *Preparation of the tertiary beta-amino alcohol.*—If an alkaline organometallic compound is employed as the vinyl component II, e.g. the respective sodium or lithium compound, then the beta-amino ketone I in the dissolved or suspended state may be used in a suitable inert solvent and the solution of the alkaline organometallic compound may be added under stirring. Suitable solvents are, for example, ether, preferably tetrahydrofuran. The operation is conducted initially at room temperature and the reaction temperature may be increased, if desired, to the boiling temperature of the respective solvent. The processing is effected in a conventional manner, i.e, the reaction mixture is hydrolyzed by mixing with water or dilute acids, e.g. hydrochloric acid or sulfuric acid, and the base is freed through adding ammonia and an ammonium chloride solution. If a N-acyl compound of the Formula I is utilized as the base material, the processing is effected in an analogous manner, preferably by adding a solution of ammonium chloride.

Reaction (a) can be conducted in a particularly advantageous way by employing a Grignard compound as the vinyl component II. In this case, the beta-amino ketone I or its N-acyl derivative is merely placed into the solution of the Grignard compound, either in an inert solvent, preferably ether, or tetrahydrofuran, or it is added in a finely pulverized state under stirring.

It is advisable to use an excess amount of the organometallic compound since, in case of a reaction of the beta-amino ketone, 1 mol of the organometallic compound is destroyed by the NH group. If the N-acyl compounds of I are utilized, however, the organometallic compound is deposited in the complex state onto the acyl group and reacts partly, particularly at higher temperatures, while the acyl group is cleaved off. At temperatures below 50° C. this reaction, however, which does not interfere with the further reactions, occurs only to a very small extent.

(b) *Saponification of the N-acyl group.*—In case the amino ketone I is relatively unstable, it is advisable to conduct the reaction (a) while utilizing the more stable N-acyl compound of the Formula I ($R_3$=acyl). In these cases it is necessary to saponify the N-acyl group again prior to reactions (c) and (d). The saponification is effected, as a rule, by treatment with alkaline agents. Such alkaline agents are preferably alkyli hydroxides in solvents which dissolve the compound to be saponified as well as the alkali hydroxide, preferably higher boiling alcohols, such as n-butanol or benzyl alcohol. In view of the fact that the saponification of N-acyl compounds generally proceeds relatively slowly, it is advisable to heat the reaction mixture for several hours to temperatures of approximately 140–160° C. The processing is effected in a customary manner by distilling off the solvent, mixing the residue with water and extracting the base which is insoluble in the excess alkali, by shaking the mixture with a suitable organic solvent, such as ether or methylene chloride.

(c) *Halogenation with allyl rearrangement.*—The hydroxyl group of a tertiary alcohol of Formula III can be replaced according to known methods by a halogen, preferably chlorine or bromine. Suitable halogenating agents are the halogenides of inorganic acids, preferably thionyl chloride or bromide, respectively, or phosphorous trichloride or bromide, respectively. It is particularly advantageous to operate with phosphorous trichloride or thionyl chloride in chloroform. Although it is possible to utilize bromides, there are, however, no advantages, as the chlorine, in forming allyl chlorides of Formula IV, is so reactive that the cyclization (stage d) occurs very easily under very moderate conditions and in a very short time. It is therefore unnecessary to increase the reactivity by changing from chloride to bromide or even to iodide.

For this reaction the free bases of Formula III as well as the hydrohalogenides thereof can be utilized. As a rule, the reaction is terminated after a heating period of from one to two hours at about 50° C. If desired, small quantities of a tertiary base, such as pyridine or trimethylamine, may also be added.

The substitution of the hydroxyl group by chlorine or bromine, respectively, in a compound of Formula III may also be accomplished by treatment with concentrated aqueous or anhydrous hydrogen chloride or hydrogen bromide, respectively, in a suitable solvent, such as glacial acetic acid or chloroform. Cis-trans-isomerism at the double bond is possible for the allyl halogenides of the general Formula IV. According to the invention, there is surprisingly obtained entirely or to the greater extent the cis-form which is particularly suitable for cyclization.

(d) *Cyclization by splitting out hydrogen halide.*—The removal of hydrogen halide from an allyl halogenide of Formula IV may be achieved by treatment with any alkali, such as sodium hydroxide, potassium hydroxide, potassium carbonate solution, or organic bases. This cleavage proceeds surprisingly smoothly and easily so that it is adequate if the solution of an allyl halogenide of the Formula IV is rendered alkaline or the solution thereof is briefly agitated in an organic solvent, such as chloroform, with an aqueous alkali.

The cyclization does not require isolation of the allyl halogenide of Formul IV in the form of a salt. It is rather preferred to convert the reaction solution accumulating during the halogenation of a tertiary alcohol of the Formula III, after evaporation of the excess halogenating agent by adding alkali and without isolating the allyl halogenide of Formula IV, directly into the desired quinolizine derivative of Formula V. The fact that this cyclization of the allyl halogenide of Formula IV proceeds so readily not only results from the very high reactivity of the halogen in the allyl position, but also from the fact that the cis-form of the allyl halogenide which is necessary for the cyclization, is, surprisingly, formed solely, or predominantly.

(e) *Hydrogenation.*—Hydrogenation of the double bond in the quinolizine derivatives of Formula V resulting from the cyclization is readily possible if customary hydrogenation catalysts are used, such as palladium, platinum black, platinum oxide, palladium on barium sulfate, or Raney-nickel and if $R_4$ represents hydrogen. In case $R_4$ represents an alkyl radical, the hydrogenation requires particularly active catalysts, and if necessary, also higher hydrogenation temperatures or hydrogenation under pressure, respectively, as the double bond in this case lies between two quarternary carbon atoms.

Instead of the sensitive free bases of Formula V, the more stable salts thereof, such as the hydrochloride or hydrobromide, are frequently used for the catalytic hydrogenation.

The hydrogenation is effected in solvents suited for the solution of the base or salts, respectively, i.e. in the case of hydrogenation of the base, for example in lower alcohols or acetic acid ester, in case of hydrogenation of the salts, in lower alcohols, glacial acetic acid, water or also in dilute aqueous acids.

STARTING MATERIALS

The beta-amino ketones of the Formula I used as the starting material may be employed either as free bases ($R_3$=H) or in the form of their N-acyl derivatives ($R_3$=acyl).

The following are some examples of beta-amino ketones of the Formula I applicable as starting material:

1-acetonyl-1,2,3,4-tetrahydro-isoquinoline,
1-acetonyl-6,7-dimethoxy-1,2,3,4-tetrahydro-isoquinoline,
1-phenacyl-1,2,3,4-tetrahydro-isoquinoline,
1-acetonyl-6,7-methylendioxy-1,2,3-tetrahydro-isoquinoline,
α,α'-bis-(6,7-dimethoxy-1,2,3,4-tetrahydro-isoquinolyl-1) acetone (meso- and racemic forms),
α,α'-bis-(6,7-diethoxy-1,2,3,4-tetrahydro-isoquinolyl-1)-acetone,
α,α'-bis-(6,7-methylendioxy-1,2,3,4-tetrahydro-isoquinolyl-1)-acetone, 1-phenacyl-6,7-dichloro-1,2,3,4-tetrahydro-isoquinoline,
1-phenacyl-6-ethyl-1,2,3,4-tetrahydro-isoquinoline,
1-acetonyl-6,7-dimethyl-1,2,3,4-tetrahydro-isoquinoline,
1-(2-oxo-nonyl)-1,2,3,4-tetrahydro-isoquinoline, etc.

Moreover, of the listed compounds, there may be employed the respective N-acyl compounds, whereby acyl preferably represents the acetyl or benzoyl group.

These tetrahydro-isoquinoline derivatives are readily accessible. Thus, beta-phenylethylamines substituted in the 3- and 4-positions may be converted according to known methods into the respective 3,4-dihydro-isoquinolines substituted in the 6,7-position (see Berichte, vol. 59, p. 2796 (1926), and vol. 62, p. 195 (1929)). The dihydro-isoquinolines thus obtained are then condensed with beta-keto acids, such as acetoacetic acid, benzoyl acetic acid (which may be substituted in the phenyl nucleus), butyryl acetic acid, caprylyl acetic acid or acetone dicarbonic acid, whereby are formed, under decarboxylation, the tetrahydro-isoquinolines substituted in the 1-position. This condensation is readily achieved in an aqueous neutral or slightly acid solution (see dissertation, G. Herbert, Technische Hochschule Darmstadt, 1956).

In the organometallic vinyl compounds of Formula II used as starting material, Z may represent an alkali metal, especially lithium. Vinyl-lithium can be produced, for example, according to Chemistry and Industry, 1959, p. 402; propenyl-2-lithium can be obtained according to methods described in Journal Chemical Society, London, 1956, p. 3333. Particularly suitable, however, are vinyl-Grignard compounds of the Formula II wherein Z represents MgX and X represents chlorine, bromine or iodine.

In a vinyl compound of the Formula II, $R_4$ may represent hydrogen or an alkyl residue having 1 to 4 C-atoms. The alkyl residues may be straight-chained or branched. Accordingly, the following organometallic vinyl compounds for example, which correspond to the Formula II, are available as starting materials: vinyl-magnesium bromide, vinyl-lithium, propenyl-2-lithium, propenyl-(2)-magnesium chloride, butene-(1)-yl-(2)-magnesium bromide, etc.

According to a preferred embodiment of the present invention, alpha,alpha'-bis-(1,2,3,4-tetrahydro-2-acyl-6,7-dimethoxy-isoquinolyl-1)-acetone is grignardized in the first reaction stage for example with alpha-ethyl-vinyl-magnesium bromide. After hydrolysis of the grignardization product and saponification of the N-acyl groups, the bis - [(1,2,3,4 - tetrahydro - 6,7 - dimethoxy - isoquinolyl-1)-methyl]-[1-butenyl-2]-carbinol is obtained. As a result of the halogenation of the carbinol with thionyl chloride or bromide, respectively, or phosphorous trichloride or bromide, respectively, the 1-[6,7-dimethoxy-1,2,3,4-tetrahydro - isoquinolyl - 1] - 2 - [(6,7 - dimethoxy-1,2,3,4, - tetrahydro - isoquinolyl - 1) - methyl] - 3-chloromethyl (or -3-bromo-methyl)-pentene(2) is obtained. This unsaturated halogenide can be cyclized by treatment with alkaline agents to 3-ethyl-9,10-dimethoxy-1,6,7,11b - tetrahydro - 2 - [(1,2,3,4 - tetrahydro - 6,7-dimethoxy - isoquinoline - 1) - methyl] - 4H - benzo-[a]-quinolizine. If particularly active hydrogenation catalysts are used, the isolated double bond in 2,3-position may be hydrogenated, whereby the corresponding saturated quinolizine derivative is formed.

If the meso-form of the symmetrically substituted beta-amino ketone is used for this reaction, then the 2-dehydro-emetine is obtained which has a particularly strong amoebicidal effect.

The process of this invention offers an entirely new way of producing quinolizine derivatives. An important advantage of the new process is due to the fact that the necessary starting compounds are easily accessible and that a comparatively few reaction stages are required. For example, when a non-acylated beta-amino ketone of the Formula I is utilized and when the isolation of the unsaturated halogenide IV is omitted, which is actually advisable in many cases, the integrated process comprises only three smoothly proceeding reactions.

The final products of this invention belong to a class of compounds which are known to have useful therapeutic properties, such as described, for example, in British patent specification 798,847, Belgian patent specifications 604,163 and 604,271 and German patent specifications 1,032,255, 1,082,912 and 1,028,123. Especially, emetine and 2-dehydro-emetine are known to possess outstanding amoebicidal activity.

It is believed that the preceding description of the invention enables one skilled in the art to practice this invention without the necessity of further information. The following preferred specific embodiments, therefore, are merely presented to illustrate the invention, and accordingly, are not intended to be limitative of the remainder of the specification or appended claims in any way whatsoever.

*Example 1*

(a) 105 g. of vinyl bromide in 240 ml. of tetrahydrofuran are reacted with 24 g. of magnesium in 210 ml. of tetrahydrofuran to form the respective Grignard-compound. After addition of another 350 ml. of tetrahydrofuran, 60 g. of 1-phenacyl-6,7-dimethoxy-1,2,3,4-tetrahydro-isoquinoline are added under stirring and cooling. The mixture is allowed to remain quiescent for 4½ hrs. at 35° C. whereafter it is decomposed with 250 ml. of saturated ammonium chloride solution under cooling with ice. The layer of tetrahydrofuran is separated and the residue is extracted with the aid of methylene chloride. From the combined organic solvents there are gained 44 g. (68% of theory) of crystalline [(6,7-dimethoxy-1,2,3,-4 - tetrahydro-iso-quinolyl - 1)-methyl]-phenyl-vinyl-carbinol with a melting point of 126–128° C. (isopropanol).

M.P. of the hydrochloride: 210–212° (ethanol).

M.P. of the hydrobromide: 215–216° (ethanol).

The same results are obtained if vinyl-lithium is used instead of vinyl magnesium bromide.

(b) 14.8 g. of [(6,7-dimethoxy-1,2,3,4-tetrahydro-isoquinolyl-1)-methyl] - phenyl-vinyl-carbinol-hydrochloride are introduced into 61 ml. of thionyl/chloride and left to stand for 16 hours at room temperataure. The excess thionyl/chloride is evaporated on the water bath. 9.7 g. of (62.6% of th.) 1-[6,7-dimethoxy-1,2,3,4-tetrahydroisoquinolyl-(1)-] - 2 - phenyl-4-chloro-butene - (2)-hydrochloride crystallize from the residue. M.P. 163–164° (ethanol).

(c) 10 g. of the hydrochloride obtained according to Example 1(b) are agitated with 45 ml. of methylene chloride and 25 ml. of 2 n-sodium hydroxide for 15 mins. From the combined organic solvents there are obtained 4.6 g. (72% of th.) of 1,4,6,7-tetrahydro-9,10-dimethoxy-2-phenyl-11bH-benzo[a]-quinolizine with a melting point of 123-125° (isopropanol).

M.P. hydrochloride: 200–201°.

M.P. hydrobromide: 214–216°.

(d) A solution of 440 mg. of the hydrochloride obtained according to 1c having a melting point of 200–201° in 22 ml. methanol and 1 ml. 2 n-sodium-hydroxide is hydrogenated at room temperature under normal pressure and in the presence of Raney-nickel. The absorption of hydrogen is terminated after 2½ hrs. After the catalyst has been filtered off, the solvent is evaporated. The residue is mixed with 5 ml. water and extracted four times with small quantities of methylene chloride. From the methylene chloride extracts, the 1,2,3,4,6,7-tetrahydro-9,10 - dimethoxy-2-phenyl-11bH-benzo[a] - quinolizine is obtained having a melting point of 89–90° (isopropanol), yield 75%.

M.P. hydrochloride: 229–230°.

M.P. hydrobromide: 202–204° (decomp.).

The starting material 1-phenacyl-6,7-dimethoxy-1,2,-

3,4-tetrahydro-isoquinoline can be prepared in the following manner:

60 g. or 6,7-dimethoxy-3,4-dihydro-isoquinoline (B.P.$_{0.15}$ 128°) in 700 ml. water and 250 ml. methanol are introduced in a citrate-buffered aqueous solution having a pH of 4.6 and are mixed with 60 g. benzoyl acetic acid in 200 ml. 2 n-sodium hydroxide. A total volume of 2 l. is reached by adding water and methanol; and the solution is left to stand for 20 hrs. at pH 4.6 and 25°. After the addition of 250 ml. of 2 n-sodium hydroxide, 1 - phenacyl - 6,7 - dimethoxy-1,2,3,4-tetrahydro-isoquinoline having a melting point of 138–139° (acetone) is separated. Yield 88%.

Example 2

(a) 19.8 g. of alpha,alpha'-bis-(N-benzoyl-6,7-dimethoxy - 1,2,3,4 - tetrahydro-isoquinolyl-1)-acetone (racemic form, M.P. 197–199°) are introduced under stirring into a solution of butene (1)-yl-(2)-magnesium bromide prepared from 16.5 g. of 2-bromine-butene-(1) and 2.95 g. of magnesium in 80 cc. tetrahydrofuran, whereby the temperature rises to 50–60° C. After 5 hrs., decomposition is effected with the aid of a saturated aqueous ammonium chloride solution; the layer of tetrahydrofuran is separated and extracted twice with the aid of methylene chloride, and the combined organic solutions are evaporated after having been dried by means of sodium sulfate. The residue solidifies to a crystalline mass, and yields, after having been triturated with 50 cc. of methanol, 19.2 g. (91% of th.) of bis-[(N-benzoyl-6,7-dimethoxy-1,2,-3,4-tetrahydro-isoquinolyl-1) - methyl] - [butene-(1)-yl-(2)]-carbinol having a melting point of 225–227° C. (dimethylformamide/ethanol).

(b) For the purpose of separating the benzoyl substituent, 25 g. of the previous product are heated for 5 hrs. at reflux in 250 cc. butanol with 16 g. of potassium hydroxide. After cooling, the crystallized potassium is removed by suction. The butanol is distilled off under reduced pressure, finally with the addition of water and the residue is dissolved with 250 cc. of ether. From this ether solution, 13 g. (63% of th.) of bis-[(6,7-dimethoxy-1,2,3,4,-tetrahydro-isoquinolyl - 1) - methyl]-[butene-(1)-yl-(2)]-carbinol are crystallized having a melting point of 126–128° C.

From the ethereal mother liquor there may be isolated further quantities in the form of the dihydrochloride (3.3 g.=17% of th.) having a melting point of 250–252° C. so that the total yield amounts to 80% of th.

(c) 5 g. of the dihydrochloride of the carbinol obtained according to Example 2b are heated to 50° for two hrs. in 50 cc. of chloroform with 50 cc. thionyl chloride. The solution is evaporated to dryness under reduced pressure, and the residue is triturated with ether and dissolved in a small quantity of methanol wherefrom 12.3 g. (44% of th.) of the dihydrochloride of 1-[6,7-dimethoxy - 1,2,3,4 - tetrahydro - isoquinolyl-1]-2-[(6,7-dimethoxy-1,2,3,4-tetrahydro-isoquinolyl - 1) - methyl] - 3-chloromethyl-pentene-(2) crystallize having a melting point of 230–233° C.

(d) For the purpose of cyclization, the aqueous solution of 2 g. of the dihydrochloride obtained according to Example 2c is mixed with excess 2 n-sodium hydroxide. The 2-dehydroisoemetine which separates thereby is extracted with the aid of methylene chloride and converted into the dihydrochloride for purification (1.8 g.=82% of th.) which, after recrystallization from ethanol, melts at 241–243° C. with the addition of ether.

It is not necessary to isolate, prior to the cyllization, the dihydrochloride of the chloride which can be produced according to Example 2c. It is possible to introduce the residue which remains after the mixture of chloroform and thionylchloride has been distilled off, after triturating with ether, into excess 2 n-sodium hydroxide, and dissolve the separated base in methylene chloride. If the base is allowed to remain, after evaporation of the solvent, in a small quantity of 2 n-hydrochloric acid, then 2.7 g. (55% of th.) of the dihydrochloride of the 2-dehydroisoemetine crystallize which melt, after recrystallization from alcohol/ether, at 241–243°.

The 2-dehydro-isoemetine, obtained from the aqueous solution of the dihydrochloride by adding diluted sodium hydroxide, melts after recrystallization from acetone/water at 93–95° C. After being dried under high vacuum at 40°, it still contains ½ mol of water of crystallization. The corresponding N-acetyl-compound melts at 153–155° C., the hydrochloride thereof melts at 256–258° C., the iodo methylate melts at 208–210° C.

The preparation of the starting compound of this example, alpha,alpha' - bis - (N - benzoyl,-6,7 - dimethoxy- 1,2,3,4 - tetrahydro - isoquinolyl - 1) - acetone, is accomplished by condensing the 2 mols of 6,7,-dimethoxy-3,4-dihydro-isoquinoline with 1 mol of acetone dicarbonic acid. The thus obtained mixture of the racemic and mesoforms may be converted into a mixture of the dihydrobromides which are readily separable on account of their different solubility in methanol or glacial acetic acid. The more difficultly soluble dihydrobromide having a melting point of 204–205° C. is the racemic compound; from the mother liquor, the isomeric dihydrobromide of the mesoform, having a melting point of 178–180°, is obtained by concentration. The racemic compound is converted in the usual manner into the dibenzoyl compound, M.P. 198°.

The 2-bromo-butene-(1) which is required for the preparation of the organometallic compound II is obtained by the splitting out of 1 mol of hydrogen bromide from 1,2-dibromo-butane in a conventional manner, e.g., with the aid of alcoholic potassium hydroxide. The mixture of the stereo-isomeric 1-bromo-butene-(1) and 2-bromo-butene-(1) formed thereby is separated by fractional distillation.

Example 3

5 g. of the racemic form of the dihydrochloride of bis-[(6,7 - dimethoxy - 1,2,3,4 - tetrahydro - isoquinolyl - 1)-methyl] - [butene - (1) - yl - (2)] - carbinol (M.P. 250–252°), which can be obtained according to Example 2b, are suspended in 50 cc. of chloroform and heated with 50 cc. of phosphorous trichloride for 5 hrs. at reflux. The chloroform solution is decanted from the phosphoric acids deposited on the flask wall and evaporated to dryness under reduced pressure. The residue is triturated with ether, mixed with ice, and after the addition of 100 cc. of methylene chloride, the resulting mixture is agitated with 100 cc. of 2 n-sodium hydroxide. The alkaline layer is extracted twice with methylene chloride. From the combined extracts there are obtained 3.0 g. (93% of th.) of a yellowish base which is dissolved in acetone for the purpose of purification and converted by the addition of ethereal hydrochloric acid, into the dihydrochloride which crystallizes upon trituration with a small quantity of isopropyl alcohol; 3.32 g. of the hydrochloride of the 2-dehydro-isoemetine (74% of th.) are obtained which melts after recrystallization from alcohol/ether at 242–253° C.; the respective base melts after recrystallization from acetone/water at 93–95°.

Example 4

2 g. of the bis - [(6,7 - dimethoxy - 1,2,3,4 - tetrahydro-isoquinolyl - 1) - methyl] - [butene - (1) - yl - (2)]-carbinol (M.P. 126–128°) are boiled for 2 hrs. at reflux with 10 cc. chloroform and 10 cc. of phosphorous trichloride with the exclusion of moisture. This mixture is evaporated under reduced pressure to dryness, and by agitating the dry residue with 50 cc. of 2 n-sodium hydroxide and 50 cc. methylene chloride without isolating the intermediate product obtained, a ring is formed to produce 2-dehydro-isoemetine. After evaporation of the methylene chloride, a quantitative yield of the base remains. After recrystallization from acetone/water there are obtained 1.4 g. (70% of th.) of 2-dehydro-isoemetine with ½ mol of water of crystallization, having a melting point of 93–95°.

*Example 5*

(a) 19.2 g. of a finely pulverized meso-form of the alpha,alpha'-bis-(N-benzoyl-6,7-dimethoxy-1,2,3,4-tetrahydro-isoquinolyl-1)-acetone which melts at 197° are slowly introduced under intense stirring into a solution of butene-(1)-yl-(2)-magnesium bromide prepared from 20.2 g. of 2-bromo-butene-(1) (B.P. 79.2–79.7° C. at 762 mm. Hg) and 3.6 g. of magnesium in 100 cc. tetrahydrofuran, whereby the temperature rises to 40–45° C. The solution is left standing for 19 hrs. at room temperature, excluding air and is then decomposed by the addition of ice and a saturated ammonium chloride solution. The layer of tetrahydrofuran is separated and the aqueous layer extracted by shaking twice with methylene chloride. The residue gained from the combined solvents is triturated with 50 cc. of n-butanol, whereby 3.9 g. (20.4% of the initially employed quantity) of unaltered initial compound crystallize.

(b) The reaction product present in the butanol solution, i.e., the bis-[(N-benzoyl-6,7-dimethoxy-1,2,3,4-tetrahydro-iso-quinolyl-1)-methyl]-[butene-(1)-yl-(2)]-carbinol, is, for the purpose of cleaving off the benzoyl residues, heated to the boiling point for 6 hrs. in an oil bath of 140° C., after having been mixed with 12 g. of potassium hydroxide and 50 cc. of butanol. This mixture is evaporated to dryness under vacuum, finally with the addition of water, and the base separated thereby is dissolved in methylene chloride. The base remaining after the evaporation is a mixture of the two theoretically possible stereoisomeric alcohols. For the separation of the predominantly formed isomer, the raw product is dissolved in 50 cc. methyl ethyl ketone, and this solution is precipitated with ethereal hydrogen bromide. The precipitate, amounting to 13.6 g. (80% of th.) of an amorphous dihydrobromide is then triturated with 50 cc. of hot water, and after cooling, pure dihydrobromide (with 9% water of crystallization) of one of the stereo-isomeric alcohols is obtained (46% of th.). The melting point is not sharp, being between 180–190°; furthermore, upon heating the melt to 200–220°, it foams up. The respective dibenzoyl compound melts at 204–206°. The free base corresponding to the hydrobromide melts after recrystallization from tetrahydrofuran at 139°, the dihydrochloride melts at 199–201° after recrystallization from ethanol.

From the aqueous mother liquor of the dihydrobromide having a melting point between 180–190° C. there may be isolated via the free base by benzoylation thereof, a second dibenzoyl compound which melts at 204–206° which together with the aforementioned stereoisomeric dibenzoyl compound which incidentally melts at the same temperature, results in a considerable lowering of the melting point. According to analysis, this compound represents the second stereoisomer possible in the meso series, i.e., bis-[(6,7-dimethoxy-1,2,3,4-tetrahydro-isoquinolyl-1)-methyl]-[butene-(1)-yl-(2)]-carbinol.

(c) For the cyclization, 5.6 g. of the dihydrochloride having a melting point between 199–201° and having been obtained according to Example 5b are heated for 8 hrs. at reflux with a mixture of 100 cc. chloroform and 45 g. phosphorous trichloride and several drops of pyridine while moisture is excluded. After cooling, this is evaporated to dryness under vacuum; the amorphous residue is dissolved in 70 cc. water and agitated with 250 cc. 2 n-sodium hydroxide and ether. From the ether solution there are obtained 3.2 g. (71.5% of th.) of 2-dehydro-emetine-(3-ethyl-9,10-dimethoxy-1,6,7,11b-tetrahydro-2-[(6,7-dimethoxy-1,2,3,4-tetrahydro-isoquinolyl-1)-methyl]-4H-benzo-[a]-quinolizine, which is purified to a large extent.

For the purpose of purification, 2.0 g. of the base are converted, with ethereal hydrogen chloride, into the dihydrochloride which, after rubbing with isopropyl alcohol, melts at 248–250°. The 2-dehydro-emetine obtained therefrom by the addition of alkali, melts after recrystallization from acetone/water, at 112–114° and contains 1 mol of water of crystallization. The compound is converted upon boiling with acetone into a modification which melts at 194–195° and which is very difficultly soluble in acetone.

With respect to the starting materials required for this example, the meso-form of the alpha,alpha'-bis-(N-benzoyl-6,7-dimethoxy-1,2,3,4-tetrahydro-isoquinolyl-1)-acetone is obtained, M.P. 178–180°, from the hydrobromide according to Example 2, last paragraph, by benzoylation to give a quantitative yield. One may also start from quaternary salts formed when 6,7-dimethoxy-3,4-dihydro-isoquinoline is heated with benzyl chloride or bromide. These salts are condensed with the acid of acetone dicarbonic acid to the alpha,alpha'-bis-(N-benzyl-6,7-dimethoxy-1,2,3,4-tetrahydro-isoquinolyl-1)-acetone which, in this case, is obtained as the uniform meso-form, and the two benzyl residues are split up by catalytic hydrogenation of the hydrochloride. One thus obtains the stericly uniform meso compound of the alpha,-alpha'-bis-(6,7-dimethoxy-1,2,3,4-tetrahydro-isoquinolyl-1)-acetone which melts at 144–145° C.

M.P. dihydrochloride: 193–195°.
M.P. methane sulfonate: 173–174°.

*Example 6*

10.5 g. of the meso-form of the alpha,alpha'-bis-(N-acetyl-6,7-dimethoxy-1,2,3,4-tetrahydro-isoquinolyl-1)-acetone which melts at 191–192° are introduced under stirring into a solution, as prepared in Example 2, of 0.122 mol of butene-(1)-yl-(2)-magnesium bromide in 80 cc. tetrahydrofuran, said solution being cooled to 10°. Additional cooling is provided so that the temperature of the reaction mixture will not rise above 25°. After decomposition with ice and 120 cc. of 20% ammonium chloride solution, the processing is effected as set forth in Example 2. The crude reaction product is, for the purpose of splitting off the acetyl substituents, heated in an oil bath of 145° for 5 hrs. together with 8 g. of potassium hydroxide in 100 cc. butanol. The butanol is evaporated under vacuum and, toward the end with the addition of water; and the residue is dissolved with methylene chloride. From the methylene chloride solutions there are obtained 8.7 g. of crude bis-[(6,7-dimethoxy-1,2,3,4-tetrahydro-isoquinolyl-1)-methyl]-[butene-(1)-yl-(2)-]-carbinol. For purification, the dihydrochloride is precipitated which, after recrystallization from ethanol, melts at 193–201°.

The further reaction of this hydrochloride to the 2-dehydro-emetine proceeds as set forth in Example 5.

*Example 7*

A solution of 33 g. of 6,7-dimethoxy-1-(2-oxononyl)-1,2,3,4-tetrahydro-isoquinoline in 45 cc. tetrahydrofuran is added within a period of 25 min. at 45° to a solution of 0.4 mol of vinyl magnesium bromide in tetrahydrofuran prepared according to Example 1. After this mixture is allowed to stand overnight, it is processed according to Example 1. In order to convert the crude reaction product into the 1-chloro-3-[(6,7-dimethoxy-1,2,3,4-tetrahydro-isoquinolyl-1)-methyl]-decene-2, it is treated, according to Example 1, with thionyl/chloride in chloroform; and the chloroform solution is thereafter stirred with 2 n-aqueous alkali for 15 min. at room temperature. In order to separate unreacted chloride, it is agitated with benzoyl/chloride and alkali and from the mixture, the tertiary base, i.e., the 9,10-dimethoxy-1,6,7,11b-tetrahydro-2-heptyl-4H-benzo[a]-quinolizidine, is separated with the aid of an acid. It is freed in a conventional manner and converted into salts.

The starting material of this example is prepared by reacting 6,7-dimethoxy-3,4-dihydro-isoquinoline with 8-keto-capric acid (Arkiv Kemie 3, 381, 1951), Chem.

Abstr. 36, 7050 (1952), analogous to the method described in Example 2 for the reaction with acetone dicarbonic acid.

Example 8

(a) 20.4 g. of 1-phenacyl-2-benzoyl-6,7-dimethoxy-1,2,3,4-tetrahydro-isoquinoline in the solid state and having a melting point of 190–193° C. are introduced under stirring at 35° into a Grignard-solution which has been prepared from 6 g. of magnesium and 33 g. of 2-bromobutene-(1) in 200 ml. of tetrahydrofuran. After a stirring period of 3½ hrs., 100 ml. saturated ammonium chloride solution are added to this mixture, the reaction taking place in an ice bath. The layer of tetrahydrofuran is separated and the aqueous phase is extracted four times with 75 ml. aliquots of methylene chloride. From the combined organic solvents there is obtained a resin which yields crystals after treatment with boiling methanol. The [(N - benzoyl-6,7-dimethoxy-1-,2,3,4-tetrahydro-isoquinolyl-1)-methyl]-phenyl-[butene-(1)-yl-(2)]-carbinol melts at 164–166° (acetic acid ester).

(b) 7.6 g. of the carbinol obtained according to Example 8a are heated for 3 hrs. at reflux in a solution of 3.6 g. of potassium hydroxide in 70 ml. of butanol. After cooling, the precipitated potassium benzoate is extracted by vacuum filtration, and the filtrate is evaporated to dryness under vacuum. The residue is agitated with 25 ml. of water and 30 ml. of methylene chloride. The aqueous phase is separated and extracted three times with 25 ml. of aliquots of methylene chloride. From the combined methylene chloride solutions, there is obtained, after the evaporation of the solvent, a resin which is dissolved in 25 ml. of isopropanol and mixed with ethereal hydrochloric acid. Thereby, there is crystallized the hydrochloride of the (6,7-dimethoxy-1,2,3,4-tetrahydro-isoquinolyl-1)-3-phenyl-2-ethyl-butene-(1)-ol-(3) having a melting point of 191–193° (isopropanol). Yield: 90%. The free base melts at 115–116° (isopropanol/water).

(c) 2.3 g. of the hydrochloride obtained according to Example 8b and having a melting point of 191–193° are heated together with 5 ml. of phosphorous/oxychloride and 5 ml. of chloroform for 5 hrs. at reflux. After the distillation of the solvent and the excess phosphorous/oxychloride, the remaining resin is stirred together with 20 ml. of chloroform and 20 ml. of 2 n-sodium hydroxide for 25 min. at room temperature. Thereby, the cyclization of the cis-compound to the 1,4,6,7-tetrahydro-9,10-dimethoxy-2-phenyl-3-ethyl-11bH-benzo[a]-quinolizine occurs. In order to obtain the final product in a pure form and to separate same from trans-[6,7-dimethoxy-1,2,3,4-tetrahydro - isoquinolyl - 1] - 4 - phenyl - 3 - chloromethyl-pentene-(3) which may also be present, a benzoylation is conducted whereby this secondary amine is converted into the N-benzoyl compound. This compound can be extracted, after acidification of the mixture, with the aid of benzene. After the addition of alkali and agitating with benzene, there is obtained from the aqueous acid solution the pure 1,4,6,7-tetrahydro-9,10-dimethoxy-2-phenyl-3-ethyl-11bH-benzo-[a]-quinolizine which is precipitated as hydrochloride from isopropanol with the aid of ethereal hydrochloric acid. M.P. 209–212° C. M.P. of the difficultly soluble perchlorate: 198–199°.

As to the production of the starting material of this invention, the 1-phenacyl-2-benzoyl-6,7-dimethoxy-1,2,3,4-tetrahydro-isoquinoline may be obtained in the following manner:

20 g. of 1-phenacyl-6,7-dimethoxy-1,2,3,4-tetrahydro-isoquinoline are mixed with 7.8 ml. of benzoyl chloride in 70 ml. of chloroform and 8 ml. of pyridine in an ice bath, and left to sit overnight. After the addition of 20 ml. of chloroform, the mixture is washed with 40 ml. 2 n-hydrochloric acid, and after having been dried over sodium sulfate, the solvent is evaporated. 1,2,3,4-tetrahydro-isoquinoline with a melting point of 190–193° crystallizes from the residue. Yield: 89%.

Example 9

In accordance with Example 2, 20 g. of alpha,alpha'-bis - (N - benzoyl - 6,7 - diethoxy - 1,2,3,4 - tetrahydro-isoquinolyl-1)-acetone are reacted with 0.12 mol of butene-(1)-yl-(2)-magnesium bromide. After saponification of the benzoyl groups, reaction with thionyl chloride and cyclization by agitating with sodium hydroxide, there is obtained the 3-ethyl-9,10-diethoxy-1,6,7,11b-tetrahydro-2 - [(1,2,3,4 - tetrahydro - 6,7 - diethoxyisoquinolyl - 1)-methyl]-4H-benzo[a]-quinolizine which is characterized as the dihydrochloride.

Example 10

In accordance with Example 2, 20 g. of alpha,alpha'-bis - (N - benzoyl - 6,7 - diethyl - 1,2,3,4 - tetrahrydro-isoquinolyl-1)-acetone are reacted with 0.12 mol of butene-(1)-yl-(2)-magnesium bromide. After saponification of the benzoyl groups, reaction with thionyl chloride and cyclization by agitating with sodium hydroxide, there is obtained the 3-ethyl-9,10-diethyl-1,6,7,11b-tetrahydro-2 - [(1,2,3,4 - tetrahydro - 6,7 - diethyl - isoquinolyl - 1)-methyl]-4H-benzo[a]-quinolizine which is characterized as the dihydrochloride.

Example 11

According to Example 1, 50 g. of 1-phenacyl-1,2,3,4-tetrahydro-isoquinoline are reacted with vinyl magnesium bromide. After treatment with thionyl chloride and cyclization, there is obtained the 1,4,6,7-tetrahydro-2-phenyl-11bH-benzo[a]-quinolizine which is isolated as the hydrochloride.

If catalytic hydrogenation is effected utilizing Raney-nickel as the catalyst, there is obtained 1,2,3,4,6,7-hexahydro-2-phenyl-11bH-benzo[a]-quinolizine.

Example 12

In accordance with Example 11, there is obtained the 1,4,6,7 - tetrahydro - 9 - chloro - 2 - phenyl - 11bH - benzo[a]-quinolizine from 1-phenacyl-6-chloro-1,2,3,4-tetrahydro - isoquinoline which can be hydrogenated to the 1,2,3,4,6,7 - hexahydro - 9 - chloro - 2 - phenyl - 11bH-benzo[a]-quinolizine.

Example 13

49.2 g. of alpha,alpha'-bis-(N-acetyl-6,7-methylenedioxy-1,2,3,4-tetrahydro-isoquinolyl-1)-acetone are introduced under stirring within 10 minutes into a solution of 0.3 mol butene-(1)-yl-(2)-magnesium bromide in tetrahydrofuran prepared according to Example 2, whereby the temperature is maintained at 20–30° C. After the mixture has been kept at 25° for five hours, it is processed as described in Example 2a. In order to split off the acetyl residues, the crude reaction product is heated to 140° for seven hours in 500 c.. butanol with 32 g. of potassium hydroxide. The butanol is thereafter distilled off under reduced pressure and finally with the addition of water. The precipitated resin is extracted with the aid of methylene chloride. The thus obtained crude bis-[(6,7 - methylenedioxy - 1,2,3,4 - tetrahydro - isoquinolyl - 1) - methyl]-[butene-(1)-yl-(2)]-carbinol is treated, as described in Example 4, with phosphorous trichloride in chloroform. The residue obtained after distillation of the chloroform and the excessive phosphorous trichloride under reduced pressure is dissolved in 100 cc. of boiling ethanol. The cold ethanolic solution is introduced into 1000 cc. of 2 n-soda lye. Cyclization to the 3-ethyl-9,10-methylenedioxy-1,6,7,11b - tetrahydro - 2 - [(1,2,3,4 - tetrahydro - 6,7-methylenedioxy - isoquinolyl - 1) - methyl] - 4H - benzo [a]-quinolizine is thus accomplished. The base is extracted with the aid of chloroform.

As to the starting material used in this example, the alpha,alpha' - bis - (N-acetyl,6,7-methylenedioxy-1,2,3,4-tetrahydro-isoquinolyl-1)-acetone is prepared by condensation of 6,7-methylenedioxy-3,4-dihydro-isoquinoline with acetone dicarbonic acid in a slightly acid aqueous solution.

The racemic and meso-form is achieved by fractional crystallization of the dihydrobromides. For this purpose, the crude product is treated with 0.5% aqueous hydrobromic acid. The hydrobromides melt at 243–247° C. (dec.) and at 188–191° (dec.).

It is to be noted that all temperatures in the specification and claims are in degrees Centigrade, and that acetone dicarbonic acid is synonymous with acetone dicarboxylic acid.

To avoid any confusion with regard to the numbering system used throughout the description of the invention, the complex compounds mentioned in Example 2 are structurally represented as follows—

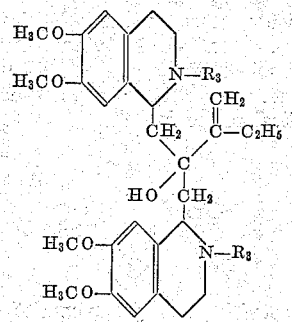

and

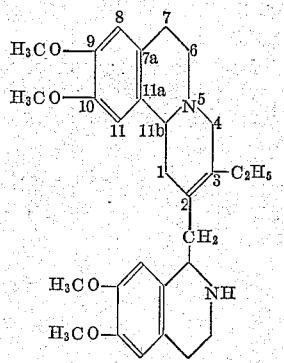

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably and intended to be within the full range of equivalence of the following claims.

What is claimed is:

1. A process for the production of quinolizine derivatives, which process comprises the steps of (1) reacting a compound of the formula

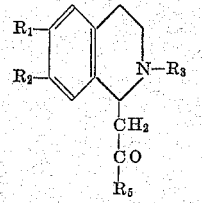

wherein $R_1$ and $R_2$ are selected from the group consisting of H, $OCH_3$, $OC_2H_5$, Cl, —O—$CH_2$—O—, and alkyl having 1–4 carbon atoms, $R_3$ is selected from the group consisting of hydrogen and hydrocarbon acyl having 1–10 carbon atoms, $R_5$ is selected from the group consisting of alkyl having 1–7 carbon atoms, phenyl, phenyl substituted by $R_1$ and $R_2$ with the provision that at least one of $R_1$ and $R_2$ is other than hydrogen, and a radical of the formula

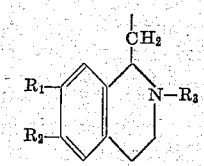

wherein $R_1$, $R_2$ and $R_3$ have the above meaning, with an organometallic compound of the formula

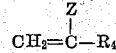

wherein $R_4$ is selected from the group consisting of hydrogen and alkyl having 1–4 carbon atoms, Z is selected from the group consisting of alkali metals, and MgX wherein X is selected from the group consisting of chlorine, bromine and iodine, said reaction forming an addition compound, (2) then hydrolyzing said addition compound in an alkaline medium to form a tertiary alcohol of the formula

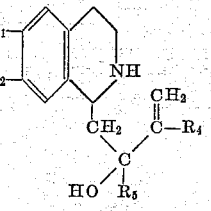

(3) then reacting said tertiary alcohol with an inorganic acid halogenide, said halogen portion selected from the group consisting of chlorine and bromine, thereby replacing the hydroxyl group with said halogen, and rearranging the positions of the halogen and the double bond to form a compound of the formula

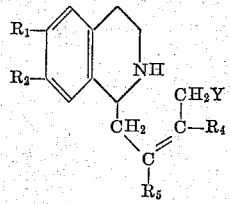

wherein Y is selected from the group consisting of chlorine and bromine, (4) and then treating said preceding compound with an alkaline reagent to split out HCl, and result in cyclization, thereby providing a quinolizine derivative of the formula

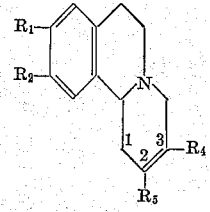

2. The process of claim 1, further comprising the step of hydrogenating the 2,3 double bond with hydrogen in the presence of a hydrogenation catalyst.

3. A process which comprises the steps of: (1) reacting the meso-form of α,α-bis-(1,2,3,4,-tetrahydro-2-acyl-6,7-dimethoxy-isoquinolyl-1)-acetone with α-ethylvinylmagnesium bromide to form an addition compound; (2) hydrolyzing said resultant addition product in an alkaline medium to form bis [(1,2,3,4-tetrahydro-6,7-dimethoxy-isoquinolyl - 1) - methyl] - [1 - butenyl - 2] - carbinol; (3) reacting said resultant carbinol with a halogenating agent selected from the group consisting of thionyl chloride and phosphorous trichloride to form 1-[6,7-dimethoxy - 1,2,3,4 - tetrahydro - isoquinolyl - 1] - 2 - [(6,7- dimethoxy - 1,2,3,4 - tetrahydro - isoquinolyl - 1) - methyl]-3-chloromethylpentene-(2); (4) treating said resultant chlorinated compound with alkali to split out HCl and to form the cyclized 3-ethyl-9,10-dimethoxy-1,6,7,11b-tetrahydro - 2 - [(1,2,3,4 - tetrahydro - 6,7 - dimethoxy-isoquinolyl-1)-methyl]-4H-benzo[a]-quinolizine.

4. The process of claim 3, including the step of hydrogenating the 2,3 position of the resultant quinolizine derivative with hydrogen in the presence of a hydrogenation catalyst.

5. A compound of the formula

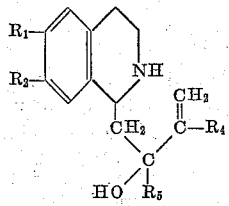

wherein
R₁ and R₂ are selected from the group consisting of H, OCH₃, OC₂H₅, Cl, —O—CH₂—O—, and alkyl having 1-4 carbon atoms,
R₅ is selected from the group consisting of alkyl having 1-7 carbon atoms, phenyl, phenyl substituted by R₁ and R₂ with the provision that at least one of R₁ and R₂ is other than hydrogen, and a radical of the formula

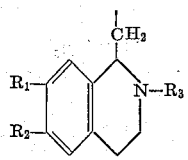

wherein R₃ is selected from the group consisting of hydrogen, alkanoyl of 1-10 carbon atoms, and hydrocarbon aroyl of 1-10 carbon atoms, and wherein R₄ is selected from the group consisting of hydrogen and alkyl having 1-4 carbon atoms.

6. A compound of the formula

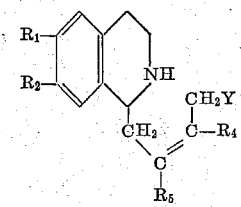

wherein R₁ and R₂ are selected from the group consisting of H, OCH₃, OC₂H₅, Cl, —O—CH₂—O—, and alkyl having 1-4 carbon atoms, wherein R₅ is selected from the group consisting of alkyl having 1-7 carbon atoms, phenyl, phenyl-substituted by R₁ and R₂ with the provision that at least one of R₁ and R₂ is other than hydrogen, and a radical of the formula

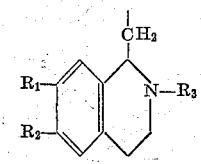

where R₃ is selected from the group consisting of hydrogen alkanoyl of 1-10 carbon atoms and hydrocarbon aroyl of 1-10 carbon atoms, wherein
R₄ is selected from the group consisting of hydrogen and alkyl having 1-4 carbon atoms, and
Y is selected from the group consisting of chlorine and bromine.

References Cited in the file of this patent
Ternbab: Chem. Abstracts, vol. 24, col. 21,100 (1960).